United States Patent Office 2,841,583
Patented July 1, 1958

2,841,583

5-ACYL-2-THIAZOLESULFENAMIDES

John J. D'Amico, Charleston, W. Va., assignor to Monsanto Chemical Company, St. Louis, Mo., a corporation of Delaware No Drawing. Application September 2, 1954
Serial No. 453,942

12 Claims. (Cl. 260—247.1)

The present invention relates to a new class of compounds, namely 5-acyl-2-thiazolesulfenamides. Such compounds may be represented by the general formula

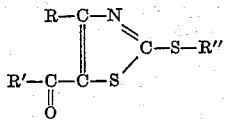

where R and R' represent hydrocarbon groups and R'' represents an amino group. Suitable examples of amino groups are $NH_2$, methylamino, ethylamino, isopropylamino, n-butylamino, sec-butylamino, n-amylamino, cyclohexylamino, alpha-methyl cyclohexylamino, benzylamino, alpha-methyl benzylamino, furfurylamino, tetrahydrofurfurylamino, beta-phenethylamino, 2-hydroxy ethylamino, dimethylamino, diethylamino, diisopropylamino, diallylamino, di-n-butylamino, diamylamino, di-beta-phenethylamino, di-2-thenylamino, N-methyl cyclohexylamino, dicyclohexylamino, di-2-cyanoethylamino, morpholinyl, piperidyl, alpha-methylpiperidyl, and gamma-methylpiperidyl. Bis thiazolyl compounds are derived from diamines, as for example 2,5-dimethyl piperazine, piperazine and alkylene diamines. They are represented by such structures as

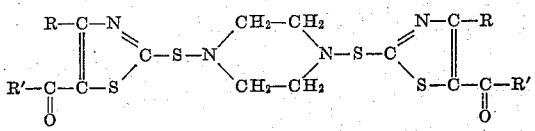

and

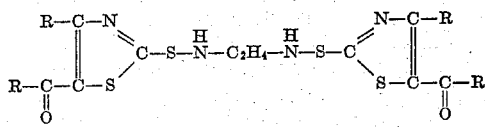

where R and R' have the same significance as before. In the foregoing formulae R and R' are preferably simple alkyl groups such as methyl, ethyl, propyl, butyl, isopropyl, isobutyl and amyl but may be alicyclic or aryl groups such as cyclohexyl, benzyl, phenyl, tolyl, naphthyl, xenyl and the like.

The 5-acyl-2-mercaptothiazoles may be prepared by condensing a 3-acyl-2,4-dione with ammonium dithiocarbamate. For example 3-chloro-2,4-pentanedione was prepared as follows: To 845 grams (8.5 moles) of 2,4-pentanedione in a suitable container provided with a mechanical stirrer, condenser, dropping funnel, thermometer and ice bath, 1140 grams (8.5 moles) of sulfuryl chloride was added dropwise at 0–5° C. over a period of 8.5 hours. The mixture was heated at 90–95° C. for 15 minutes to complete the reaction, then cooled at 25° C., extracted with 500 ml. of 10% aqueous sodium bicarbonate, washed with water until the washings were neutral to litmus and finally dried over sodium sulfate. Distillation of the reaction mixture under 28 mm. pressure gave 880 grams of 3-chloro-2,4-pentanedione, a colorless liquid, B. P. 60–63° C.

236 grams of the 3-chloro-2,4-pentanedione was added to a solution of 194 grams (1.76 moles) of ammonium dithiocarbamate in 1300 grams of water. The reaction mixture was stirred vigorously, the exothermic reaction causing the temperature to rise to about 52° C. and within a short time a solid precipitated. The mixture was stirred for about 8 hours and then the solids filtered off, washed with water until the washings were neutral to litmus and finally dried in an oven at 50° C. There was obtained 226 grams or 74.4% of 2-mercapto-4-methyl-5-thiazolyl methyl ketone, a yellow solid, M. P. 210–211° C. when recrystallized from ethyl alcohol. Analysis for nitrogen gave 8.00% and for sulfur 37.30% as compared to calculated values for $C_6H_7NOS_2$ of 8.09% nitrogen and 37.01% sulfur.

5 - ACETYL - N,N - DIETHYL - 4 - METHYL - 2-THIAZOLESULFENAMIDE

An aqueous solution containing 43.3 grams (0.25 mole) of 2-mercapto-4-methyl-5-thiazolyl methyl ketone, 170 grams of water, and 40.0 grams (0.25 mole) of a 25% aqueous sodium hydroxide solution was prepared in a one liter narrow beaker equipped with a mechanical mixer, dropping funnel, ice bath, and thermometer. To this solution at 15° C., 73 grams (1.0 mole) of diethylamine was added at such a rate that the reaction mixture did not exceed a temperature of 27° C. The mixture was cooled to 13° C. and 42 ml. of 25% sulfuric acid was added dropwise at 13–15° C. in 20 minutes. To this mixture at 13–20° C. there was added, drop by drop, with stirring over a period of two hours, 170 ml. (15.0 g./100 ml.) of sodium hypochlorite solution. The excess sodium hypochlorite was destroyed by the addition of one gram of sodium sulfite. The reaction mixture was cooled to 10° C., extracted with 500 ml. of ethyl ether, the ether extract washed with water until the washings were neutral to litmus, dried over sodium sulfate, and finally the ether removed in vacuo. A yield of 25 grams of a dark oily product was obtained. Analysis gave 11.52% nitrogen and 26.31% sulfur as compared to 11.46% nitrogen and 26.24% sulfur calculated for $C_{10}H_{16}N_2OS_2$.

5 - ACETYL - N - CYCLOHEXYL - 4 - METHYL - 2-THIAZOLESULFENAMIDE

An aqueous solution containing 43.3 grams (0.25 mole) of 2-mercapto-4-methyl-5-thiazolyl methyl ketone, 170 grams of water, and 40.0 grams (0.25 mole) of a 25% aqueous sodium hydroxide solution was prepared in a one liter narrow beaker equipped with a mechanical mixer, dropping funnel, ice bath, and thermometer. To this solution at 15° C., 99 grams (1.0 mole) of cyclohexylamine was added at such a rate that the reaction mixture did not exceed a temperature of 27° C. The mixture was cooled to 13° C. and 42 ml. of 25% sulfuric acid was added dropwise at 13–15° C. in 20 minutes. To this mixture at 13–20° C. there was added, drop by drop, with stirring over a period of two hours, 170 ml. (15.0 g./100 ml.) of sodium hypochlorite solution. The excess sodium hypochlorite was destroyed by the addition of one gram of sodium sulfite. The yellow solid precipitate was removed by filtration, washed with water and dried at room temperature. 47 grams representing a yield of 69.8% was obtained, M. P. 114–115° C. Analysis gave 10.39% nitrogen and 23.27% sulfur as compared to 10.36% nitrogen and 23.72% sulfur calculated for $C_{12}H_{18}N_2OS_2$.

5-ACETYL-N-ISOPROPYL-4-METHYL-2-THIAZOLESULFENAMIDE

An aqueous solution containing 43.3 grams (0.25 mole) of 2-mercapto-4-methyl-5-thiazolyl methyl ketone, 170 grams of water, and 40.0 grams (0.25 mole) of a 25% aqueous sodium hydroxide solution was prepared in a one liter narrow beaker equipped with a mechanical mixer, dropping funnel, ice bath, and thermometer. To this solution at 15° C., 59.1 grams (1.0 mole) of monoisopropylamine was added at such a rate that the reaction mixture did not exceed a temperature of 27° C. The mixture was cooled to 13° C. and 42 ml. of 25% sulfuric acid was added dropwise at 13–15° C. in 20 minutes. To this mixture at 13–20° C. there was added, drop by drop, with stirring over a period of three hours, 190 ml. (15.0 g./100 ml. of sodium hypochlorite solution. The excess sodium hypochlorite was destroyed by the addition of one gram of sodium sulfite. The reaction mixture was cooled to 10° C., extracted with 500 ml. of ethyl ether, the ether extract washed with water until the washings were neutral to litmus, dried over sodium sulfate, and finally the ether removed in vacuo. The residue remaining after the removal of the ether was a semi-solid. The latter was diluted with water, the solid removed by filtration and dried at room temperature. 40 grams representing a 69.5% yield of a tan solid was obtained, M. P. 50–52° C. Analysis gave 11.97% nitrogen and 27.72% sulfur as compared to 12.16% nitrogen and 27.84% sulfur calculated for $C_9H_{14}N_2OS_2$.

4-(5-ACETYL-4-METHYL-2-THIAZOLYL-SULFENYL)MORPHOLINE

An aqueous solution containing 43.3 grams (0.25 mole) of 2-mercapto-4-methyl-5-thiazolyl methyl ketone, 170 grams of water, and 40.0 grams (0.25 mole) of a 25% aqueous sodium hydroxide solution was prepared in a one liter narrow beaker equipped with a mechanical mixer, dropping funnel, ice bath, and thermometer. To this solution at 15° C., 65.5 grams (0.75 mole) of morpholine was added at such a rate that the reaction mixture did not exceed a temperature of 27° C. The mixture was cooled to 13° C. and 42 ml. of 25% sulfuric acid was added dropwise at 13–15° C. in 20 minutes. To this mixture at 13–20° C. there was added, drop by drop, with stirring over a period of two hours, 160 ml. (15.0 g./100 ml.) of sodium hypochlorite solution. The excess sodium hypochlorite was destroyed by the addition of one gram of sodium sulfite. The solids were removed by filtration, washed with water and dried at room temperature. The product was a buff solid, M. P. 115–116° C. The yield was 56 grams or 86.7% of theoretical. Analysis gave 11.08% nitrogen and 24.47% sulfur as compared to 10.84% nitrogen and 24.82% sulfur calculated for $C_{10}H_{14}N_2O_2S_2$.

As exemplary of the accelerating activity of sulfenamides rubber stocks were compounded comprising:

| Stock | A | B | C |
|---|---|---|---|
| | Parts by weight | | |
| Pale crepe rubber | 100 | 100 | 100 |
| Furnace carbon black | 50 | 50 | 50 |
| Zinc oxide | 5 | 5 | 5 |
| Saturated hydrocarbon softener | 3 | 3 | 3 |
| Stearic acid | 2 | 2 | 2 |
| Sulfur | 2.5 | 2.5 | 2.5 |
| Condensation product of p-amino biphenyl and acetone | 1.5 | 1.5 | 1.5 |
| 5-Acetyl-N,N-diethyl-4-methyl-2-thiazole-sulfenamide | 0.8 | | |
| 5-Acetyl-N-cyclohexyl-4-methyl-2-thiazole-sulfenamide | | 0.8 | |
| 4-(5-Acetyl-4-methyl-2-thiazolysulfenyl)-morpholine | | | 0.8 |

The stocks so compounded were cured in the usual manner by heating in a press for 30 minutes at 144° C. The physical properties of the vulcanizates are set forth below:

Table I

| Stock | Modulus of Elasticity in lbs./in.² at Elongation of 300% | Tensile at Break in lbs./in.² | Ultimate Elongation, percent |
|---|---|---|---|
| A | 2,980 | 4,205 | 413 |
| B | 3,210 | 4,170 | 415 |
| C | 3,113 | 4,133 | 406 |

Evaluation of the processing safety of the stocks by means of a Mooney Plastometer revealed that 5-acetyl-N-cyclohexyl-4-methyl-2-thiazolesulfenamide and 4-(5-acetyl-4-methyl-2-thiazolylsulfenyl)morpholine were delayed action type accelerators equivalent in processing safety to the commercial accelerator N-cyclohexyl-2-benzothiazolesulfenamide. On the other hand 5-acetyl-N,N-diethyl-4-methyl-2-thiazolesulfenamide was an accelerator of a different type possessing no significant delayed action.

5-ACETYL-4-METHYL-2-THIAZOLE-SULFENAMIDE

An aqueous solution was prepared by dissolving 43.3 grams (0.25 mole) of 2-mercapto-4-methyl-5-thiazolyl methyl ketone in 130 ml. of water containing 10.0 grams (0.25 mole) of sodium hydroxide. This solution and 148 ml. of an aqueous solution containing 15.1 grams of sodium hypochlorite per 100 ml. were added gradually at equal rates by volume to 750 ml. of concentrated ammonium hydroxide (d=0.9) at 0 to 5° C. The addition required about one and one-half hours, after which the reaction mixture was stirred for one hour at 25–28° C. and 4 grams of sodium sulfite added to destroy excess oxidizing agent. The product was collected by filtration, washed with water until free of chloride and air dried at room temperature. A solid product, M. P. 83–85° C., was obtained in a yield of 59.5 grams. Analysis gave 14.63% nitrogen and 34.22% sulfur as compared to 14.88% nitrogen and 34.06% sulfur calculated for $C_6H_8N_2OS_2$. The product is stable to storage at ordinary temperatures. Moreover, it proved to be an active accelerator of vulcanization as described below. A rubber stock was compounded comprising:

Stock D (Parts by weight)
Smoked sheets rubber _____ 100.
Philblack O (carbon black) _____ 50.
Zinc oxide _____ 5.
Stearic acid _____ 2.
Saturated hydrocarbon softener _____ 3.
Sulfur _____ 2.5
5-acetyl-4-methyl-2-thiazolesulfenamide ____ 0.5

After curing the stock in the usual manner by heating in a press for 60 minutes at 144° C., the modulus of elasticity at 300% elongation was 2010 and the tensile at break was 3140 lbs./in.₂.

It is intended to cover all changes and modifications of the examples of the invention herein chosen for purposes of disclosure which do not constitute departures from the spirit and scope of the invention.

This application is a continuation-in-part of application Serial No. 294,930, filed June 21, 1952, now issued as United States Patent No. 2,704,761.

What is claimed is:
1. A compound of the structure

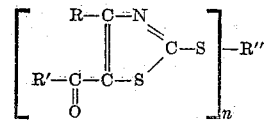

where R and R' represent lower alkyl groups and R" represents an amino group selected from the group consisting of $NH_2$, lower alkylamino, di-(lower alkyl)amino, cyclohexylamino, methylcyclohexylamino, benzylamino, alpha-methyl benzylamino, furfurylamino, tetrahydrofurfurylamino, beta-phenethylamino, 2-hydroxyethylamino, diallylamino, di-beta-phenethylamino, di-2-thenylamino, N-methyl cyclohexylamino, dicyclohexylamino, di-2-cyanoethylamino, morpholinyl, piperidyl, methyl piperidyl, piperazyl, methyl piperazyl and ethylene diamino and n is a whole number greater than zero but less than 3 equal to the number of amino groups in R″.

2. A sulfenamide of 4-lower alkyl 5-lower alkylcarbonyl 2-mercaptothiazole in which the amino group attached to the sulfur in the 2-position of the thiazole ring is a lower alkylamino group.

3. A compound of the structure

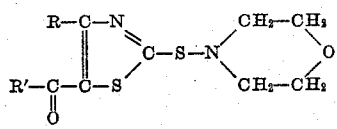

where R and R′ represent lower alkyl groups.

4. A compound of the structure

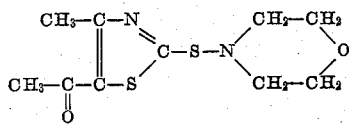

5. A compound of the structure

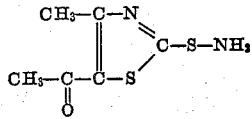

6. A compound of the structure

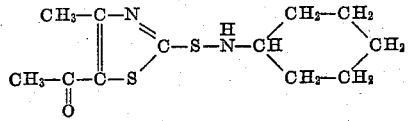

7. A compound of the structure

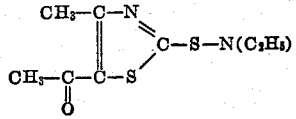

8. A compound of the structure

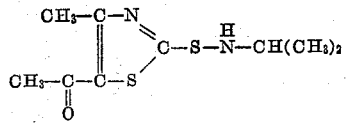

9. The method which comprises condensing a nitrogen compound selected from the class consisting of ammonia, lower alkylamines, di-(lower alkyl) amines, cyclohexylamine, methylcyclohexylamine, benzylamine, alpha-methyl benzylamine, furfurylamine, tetrahydrofurfurylamine, beta-phenethylamine, 2-hydroxyethylamine, diallylamine, di-beta-phenethylamine, di-2-thenylamine, N-methyl cyclohexylamine, dicyclohexylamine, di-2-cyanoethylamine, morpholine, piperidine, methyl piperidine, piperazine, methyl piperazine and ethylene diamine and a mercaptan of the structure

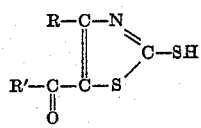

where R and R′ represent lower alkyl groups in the presence of an oxidizing agent and recovering a sulfenamide.

10. The method which comprises condensing a lower alkyl amine and a mercaptan of the structure

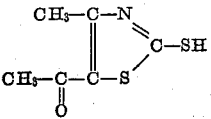

in the presence of an oxidizing agent and recovering a sulfenamide.

11. The method of claim 10 where the oxidizing agent is sodium hypochlorite.

12. The method which comprises condensing morpholine and a mercaptan of the structure

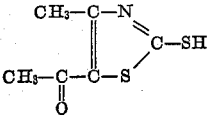

in the presence of an oxidizing agent and recovering a sulfenamide.

No references cited.